United States Patent [19]

Brook et al.

[11] 4,036,669

[45] July 19, 1977

[54] MECHANICAL PRECONDITIONING METHOD

[75] Inventors: Greville B. Brook, Bucks, England; Peter L. Brooks, Palo Alto; Roger F. Iles, Foster City, both of Calif.

[73] Assignee: Raychem Corporation, Menlo Park, Calif.

[21] Appl. No.: 550,555

[22] Filed: Feb. 18, 1975

[51] Int. Cl.$^2$ .............................................. C22F 1/08
[52] U.S. Cl. ......................... 148/11.5 C; 148/12.7 C; 148/131
[58] Field of Search ................. 148/11.5 R, 11.5 F, 148/131, 2, 11.5 C, 12.7 C

[56] References Cited

U.S. PATENT DOCUMENTS

| 3,783,037 | 1/1974 | Brook et al. | 148/11.5 R |
| 3,802,930 | 4/1974 | Brook et al. | 148/11.5 R |

*Primary Examiner*—R. Dean
*Attorney, Agent, or Firm*—Lyon & Lyon

[57] ABSTRACT

Certain metallic compositions undergo a reversible transformation between an austenitic state and a martensitic state. The temperature at which these compositions begin to undergo the transition from martensite to austenite can be raised by deforming an article formed from the composition and maintaining it while in the deformed state at a temperature at which the composition would normally exist in the austenitic state.

16 Claims, No Drawings

MECHANICAL PRECONDITIONING METHOD

FIELD OF THE INVENTION

This invention relates to heat recoverable metallic compositions. More specifically it relates to metallic compositions, and the method by which they are obtained, that undergo a transformation from a martensitic state to an austenitic state at higher than the temperature at which such transformation would occur absent treatment in accordance with the process of the instant invention.

BACKGROUND OF THE INVENTION

Metallic compositions which that are known to be capable of undergoing a reversible transformation from the austenitic state to the martensitic state include unalloyed metals but this phenomenon is most commonly exhibited by alloys. Such alloys include, for example, those disclosed in U.S. Pat. Nos. 3,012,882, 3,174,851; 3,351,463; 3,567,523; 3,753,700; and 3,759,552, Belgian Pat. No. 703,649 and in British Pat. Nos. 22372/69, 55481/69, 55482/69, 55969/69 and 53734/70 (Now Brit. Pat. Nos. 2,315,652; 1,315,653; 1,346,046 and 1,346,047) in the name of the Fulmer Research Institute. The disclosure of each of the aforementioned patents and applications is incorporated herein by reference.

Such alloys are disclosed in NASA Publication SP110, "55-Nitinol-the alloy with a memory, etc." (U.S. Government Printing Office, Washington, D.C., 1972), N. Nakanishi et al, *Scripta Metallurgica* 5, 433–440 (Pergamon Press 1971), the disclosures of which are likewise incorporated herein by reference.

These, and some other alloys, have in common the feature of undergoing a shear transformation on cooling from a relatively high temperature (austenitic) state to a relatively low temperature (or martensitic) state. If an article made of such an alloy is deformed when in its martensitic state it will remain so deformed. If it is heated to return it to a temperature at which it is austenitic, it will tend to return to its undeformed state. The transition from one state to the other, in each direction, takes place over a temperature range. The temperature at which martensite starts to form on cooling is designated $M_s$ while the temperature at which this process is complete is designated $M_f$, each of these temperatures being those achieved at high, e.g., 100° C per minute, rates of change of temperature of the sample. Similarly, the temperature of the beginning and end of the transformation to austenite are designated $A_s$ and $A_f$ respectively. Generally, $M_f$ is a lower temperature than $A_s$, $M_s$ is a lower temperature than $A_f$ and $M_s$ can be lower, equal to or higher than $A_s$, for a given alloy depending on composition and thermomechanical history. The transformation from one form to the other may be followed by measuring one of a number of physical properties of the material in addition to the reversal of deformation described above, for example, its electrical resistivity, which shows an anomaly as the transformations take place. If graphs of resistivity-v-temperature or strain-v-temperature are plotted, a line joining the points $M_s$, $M_f$, $A_s$, $A_f$ and back to $M_s$ forms a loop termed the hysteresis loop (see Diagram 1, below). For many materials $M_s$ and $A_s$ are at approximately the same temperature.

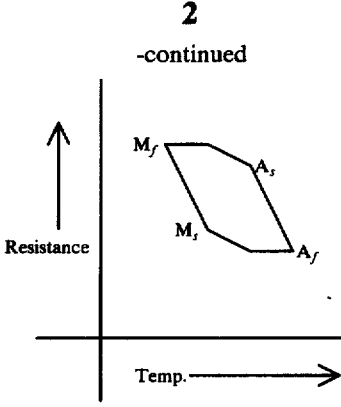

Diagram 1

In certain commercial applications employing heat recoverable alloys, it is desirable that $A_s$ be at a higher temperature than $M_s$, for the following reason. Many articles constructed from such alloys are provided to users in a deformed One particularly useful alloy possessing heat recoverability or shape memory is the intermetallic compound TiNi, as described in U.S. Pat. No. 3,174,851. The temperature at which deformed objects of heat recoverable alloys return to their original shape depends on the alloy composition as disclosed in British Pat. No. 1,202,404 and U.S. Pat. No. 3,753,700, e.g., the recovery of original shape can be made to occur below, at, or above room temperature. condition and in the martensitic state. For example, couplings for hydraulic components, as disclosed in U.S. Pat. applications Ser. No. 852,722 filed Aug. 25, 1969 and No. 51809 filed July 2, 1970 (British Nos. 1,327,441 and 1,327,442), are sold in a deformed (i.e., an expanded) state. The customer places the expanded coupling over the components (for example, the ends of hydraulic pipe lines) to be joined and raises the temperature of the coupling. As its temperature reaches the austenitic transformation range, the coupling returns, or attempts to return, to its original configuration, and shrinks onto the components to be joined. Because it is necessary that the coupling remain in its austenitic state during use (for example, to avoid the stress relaxation which occurs during the martensitic transformation and because its mechanical properties are superior in the austenitic state), the $M_s$ of the material is chosen so as to be below the lowest temperature which it may possibly reach in service. Thus, after recovery, during service the material will remain at all times in the austenitic state. For this reason, once deformed it has to be kept in, for example, liquid nitrogen until it is used. If, however, the $A_s$ ($A_s$ as used herein, means that temperature which marks the beginning of a continuous sigmoidal transition as plotted on a strain vs. temperature graph, to the austenitic state of all the martensite capable of undergoing that transformation) could be raised, if only temporarily for one heating cycle, without a corresponding rise in the $M_s$ then the expanded coupling could be maintained at a higher and more convenient temperature. The advantage this would provide is an obvious one. For example, if the $A_s$ of the alloy from which it is made could be raised sufficiently to allow the coupling to be handled at ambient temperature without recovery occuring, it would be possible to avoid the problems and expense associated with prolonged storage of the heat recoverable coupling that must be kept in liquid nitrogen after deformation.

In copending and commonly assigned U.S. application "Heat Treating Method", Ser. No. 550,847, filed on even date herewith (Lyon & Lyon Docket No. 145/201) as a C.I.P. of application Ser. No. 417,067, filed Nov. 19, 1973, abandoned the disclosure of both of which are incorporated by reference, we have described a method by which the $A_s$ of certain metallic compositions can be raised for one heating cycle. This method comprises first lowering the temperature of the composition from that at which it exists in the austenitic state to below its $M_f$ temperature. Then the composition is heated to a temperature at which normally it would exist wholly in the austenitic state, i.e. above the $A_f$ temperature. However, the transformation from martensite to austenite does not occur if the heating rate selected is a "slow" one. The definition of a "slow" heating rate is fully set forth in said copending application. Suffice it to say that it can vary depending upon the nature of the metallic composition but is easily determined by one skilled in the art having the benefit of said application.

If the composition is cooled after slow heating is complete and subsequently reheated at a rapid rate it does not begin to undergo a martensite to austenite transformation until the approximate temperature at which slow heating was terminated is reached. More importantly, if an article was made from the composition and deformed while in the martensite state either prior to, or after, slow heating is terminated, it will not begin to undergo recovery to the form in which it existed in the austenitic state until it reaches approximately the temperature at which slow heating was terminated. We refer to this process as "thermal preconditioning."

Disclosed by reference in our other copending application cited hereinabove is our discovery that the tendency of some metallic compositions to lose martensite-austenite reversibility, e.g. particularly as occurs with some compositions with $M_s$ of 0° C or higher, can be inhibited. This method comprises "aging" the composition by holding it an an elevated temperature, typically 50°–150° C, in which it exists in the austenitic state prior to transforming it to the martensite state. The aging temperature and the holding time required to inhibit loss of this reversibility can vary according to the nature of the composition but can be readily determined by those skilled in the art having the benefit of the disclosure in said application.

As a result of our previous discoveries, it has been found possible to prepare useful heat recoverable articles from metallic compositions which as a result of our treatment have a significantly reduced tendency to lose martensite-austenite reversibility and also have an elevated $A_s$ temperature. However, notwithstanding the many advantages that our discoveries have provided the art, in order to elevate the $A_s$ temperature for metallic compositions it is necessary that equipment capable of providing a controlled "slow" heating rate be employed. Furthermore, it is necessary that some preliminary investigation be done with compositions other than those specifically described by us in order to determine the optimum slow heating rate. Finally, the "slow" heating rate necessary to avoid the onset of recovery may necessitate an undesirably long preconditioning period to achieve the desired $A_s$. Therefore, it would be advantageous to have a method by which an elevated $A_s$ can be imparted to metallic compositions capable of undergoing a reversible transformation between an austenitic state and a martensitic state that does not suffer these limitations.

Accordingly, it is an object of this invention to provide an improved method for imparting an elevated $A_s$ for at least one heating cycle to metallic compositions that undergo a reversible transformation between an austenitic state and a martensitic state. It is yet another object of this invention to provide novel metallic compositions that have such as elevated $A_s$ temperature.

SUMMARY OF THE INVENTION

The present invention provides an improved method for imparting an elevated $A_s$ to a metallic composition capable of undergoing a reversible transformation between an austenitic state and a martensitic state. The method comprises maintaining the composition in a deformed configuration at a temperature above its normal $M_s$ for a length of time sufficient to cause at least a portion of the deformation to be retained when the constraining means is removed. The amount of deformation retained is a function of the temperature at which the composition is held and the duration of the holding step. This method can be denominated "mechanical preconditioning".

A composition can be deformed while in the austenitic state. Typically, however, this requires a great deal of force. Accordingly, it is preferred to deform the composition while it is in the more workable condition that occurs near or within the $M_s$–$M_f$ range and then to raise its temperature while restrained to the desired holding temperature above $M_s$.

A mechanically preconditioned article when heated at a fast rate will recover at least partially to its initial configuration.

DETAILED DESCRIPTION OF THE INVENTION

It is known that the application of a load or stress to a article made from a metallic composition in the austenitic state, for example by applying tension, compression or tension or by bending the sample, can result in an introduction of strain in the sample by means of a stress induced transformation of a portion of the austenite to martensite. This strain, which disappears when the load is removed, is referred to as "pseudoelastic strain" because it differs from normal elastic behavior in that stress does not vary linearly with strain. See H. Pops, *Met. Trans.* 1 (1) 251–58 (1970). This strain disappears because the transformation to martensite induced by the applied stress is reversed back to austenite in an elastic, but non-Hookian, manner. Generally, there exists a maximum temperature up to which stress induced martensite formation will occur. This temperature, which can vary as the metallic composition varies, is usually referred to as $M_d$.

The reversibility between stress induced pseudoelastic martensite and the austenitic state is a phenomenon that is superficially similar to the shape memory effect observed when a sample of a metallic composition that has been deformed while in a low temperature stable martensitic state, undergoes a return to its original configuration when heated to a temperature range over which the martensite reverts to austenite. The major differences between this phenomenon and that associated with pseudoelastic martensite is that, in the latter, the formation of martensite is localized at the area of stress and the transition between martensite and austenite, as well as the reverse, is an isothermal one.

For the latter reason, reversible pseudoelastic strain, while of theoretical interest, does not lend itself to the practical applications that are possible when utilization is made of the thermally recoverable strain achieved by deforming a sample of a metallic composition below its $M_f$ and holding it there until it is desired to recover the strain. However, as pointed out above, this latter process will frequently require that the sample be maintained at a relatively low temperature i.e., below $A_s$, to prevent recovery until desired unless the temperature at which the onset of the transition to austenite normally occurs ($A_s$) can be advanced sufficiently to allow the sample to be handled without recovery at ambient temperature. To date, the only method by which this has been possible is the hereinabove discussed method of "thermal preconditioning."

The present invention provides another novel, method by which the reversion of a deformed article of a given metallic composition to the original configuration it enjoyed in the austenitic state is caused not to occur until it reaches a temperature above the normal $A_s$-$A_f$ range, i.e., the normal reversion temperature associated with the given metallic composition. This method comprises deforming the sample or article from an original configuration and holding it in that deformed condition at a temperature below $M_d$, but above $M_s$, for a period of time sufficient to result in a retention of at least a portion of the original strain when the stress is released. Subsequent fast heating of the sample, i.e., at a rate that precludes further elevation of $A_s$ by thermal preconditioning, preferably 100° C/min or greater, will result in the recovery of at least a portion of that retained strain. Accordingly, this invention also provides heat recoverable metallic compositions that have an elevated $A_s$-$A_f$ range which is elevated in comparison to the $A_s$-$A_f$ range normally associated with a particular composition.

Generally speaking, the method of this invention is applicable to a wide variety of metallic compositions that undergo reversible austenite-martensite transformations. It is particularly suited to metallic compositions that are alloys, and more particularly, to alloys that form electron compounds. Preferred electron compounds are those corresponding to the Hume-Rothery designation for structurally analogous body-centered cubic phases (e.g. beta-brass) or electrons compounds that have ratios of about 3 valence electrons to 2 atoms. See *A.S.M. Metals Handbook, Vol.* 1, 8th Ed. (1961) at p. 4.

Among suitable alloys may be included $\beta$ phase alloys, for example, those typified by the copper-zinc and copper-aluminum alloys that form $\beta$ alloys of the body centered cubic type associated with $\beta$-brass. Among these are those alloys of copper and zinc or copper and aluminum in which zinc and aluminum may at least partially replace each other and which themselves can be partially replaced by other alloying elements for example, silicon, tin, manganese or mixtures thereof. Some alloys within this description are discussed in detail in our aforementioned copending application disclosing the thermal preconditioning process. Preferred alloys include those comprised of from about 60–85 wt. % copper with varying amounts of zinc and/or aluminum in combination with silicon, manganese or mixtures thereof, for example alloys having, 0 to 40 wt. % zinc, 0 to about 5 wt. % silicon, 0 to about 14 wt. % aluminum and 0 to about 15 wt. % manganese that form body centered cubic type structures. Ternary, quaternary, and more complex alloys of copper can be used. In the examples, a number of specific alloys that fall within these limits will be discussed in greater detail. However, it should be understood that the method of this invention may be applied beyond the limits of the preferred embodiments. For example, it is within the scope of this invention to apply the method of the present invention to alloys based on metals other than copper.

Alloys of this type are obtained in a $\beta$-phase by methods well known to the art. Usually the $\beta$-phase is obtained by rapidly quenching the alloy from an elevated temperature at which it exist in substantial part as a stable $\beta$-phase to a temperature at which it will exist as a metastable $\beta$-phase. If the quenching rate is too slow, extensive amounts of a second phase may form which does not undergo the reversible austenite-martensite transformation. However, an alloy that is at least substantially in the $\beta$-phase, e.g., over 70% beta, may still possess to a substantial extent the same useful properties as the pure $\beta$-phase structure.

If the alloy is quenched to below its $M_s$ temperature, the ability to be subsequently rendered heat recoverable can be adversely affected. Accordingly, it is desirable to quench the alloy to a temperature above $M_s$ at a rate such that no significant $\alpha$-phase formation will result. For alloys with an $M_s$ below about 0° C, a quenchant temperature of about 20° C is satisfactory. This can be achieved, for example, by quenching the alloy in water at 20° C.

In the practice of this invention, the chosen alloy employed is fabricated into an article having the shape desired after heat recovery. The deformation of the article into the configuration from which heat recovery is desired, i.e., a configuration which will ultimately be that of the heat unstable (i.e., heat recoverable) state, can be accomplished at temperatures below the $M_d$ temperature. For example, the deformation can be accomplished while the article is in the austenitic state whereby the initial strain introduced into the article will be of the "pseudo-elastic" type known to the prior art since its unduly rapid release would result in the deformation undergoing the previously described isothermal recovery. Nevertheless, by holding the article in the deformed condition for a suitable length of time, at least a portion of the originally "pseudo-elastic" strain will convert into strain that is retained after the stress is removed. That portion of the originally pseudoelastic strain that is not retained can be referred to as "springback."

To recover the retained strain, the sample is rapidly heated, as hereinbefore described, through the temperature range in which the transformation to austenite occurs. Any portion of the retained strain that does not recover, a not uncommon occurrence in the case of martensite-austenite transformation, is referred to as "non-recoverable strain." The rate of heating necessary to recover the strain must be sufficiently "fast" to avoid the effect of "thermal preconditioning" as previously described since if an article is heated unduly slow recovery will not occur. Since a suitable rate will vary according to the nature of the alloy, it is not possible to specify absolute rates of heating which would qualify as slow or fast for all alloys. However, the significance of these terms will be clear from the previous discussion herein and from a consideration of our copending application relating to thermal preconditioning, the disclosure of which has been incorporated herein by reference. With that information, a rate of heating qualifying as "fast" is readily ascertained.

If held long enough in the deformed state essentially all the original strain will be retained when the stress is removed. The length of time necessary to have significant retained strain at a given temperature varies according to the composition and the thermomechanical history of the alloy. Generally speaking, for a given alloy the length of the necessary holding time decreases as the holding temperature increases. Nevertheless, there may be a penalty incurred if the holding temperature is too high as a significant portion of the retained strain may be rendered non-recoverable. However, "mechanical preconditioning" has been carried out at temperatures as high as about 200° C. From this discussion, it will be apparent that the optimum combination of holding temperature and period of constraint, i.e., the period during which the article is under stress, will vary as the nature of the alloy varies but that this combination can be readily ascertained. In an optimum case up to about 10% heat recoverable strain is achievable with articles treated by the method of this invention.

In the case of thermal preconditioning, the temperature of the elevated $A_s$, referred to as $A_{se}$, is often approximately at the temperature where the slow heating is terminated. This is not the case with the mechanical preconditioning method of this invention. It can be below, at or above the holding temperature. In general, it increases as the length of the holding time is increased. Routine experimentation with a given alloy will make it possible to determine the amount of preconditioning necessary to achieve the desired elevation in $A_s$. Storage at ambient temperature after mechanical preconditioning may result in a loss of some heat recoverability but does not affect the elevated $A_s$ temperature.

As indicated above, in a presently preferred embodiment of this invention, the article is deformed from its original configuration while in the austenitic state, i.e., under conditions where the initial strain induced in the article may be regarded as essentially pseudoelastic. However, metallic compositions suitable for use in this invention are usually more easily deformed as their temperature is lowered from the holding temperature, e.g. until near, within or below the $M_s$-$M_f$ range. Accordingly, it is within the scope of this invention to preliminarily lower the temperature of the article, for example, to below the $M_s$-$M_f$ range to facilitate its deformation, deform it and then to heat it while using constraining means to keep it deformed up to the desired holding temperature above the normal $A_s$-$A_f$ range is reached for the required time.

In contradistinction to the situation with the thermal preconditioning process, the rate of heating to reach the elevated holding temperature need not be a slow one, as heretofore defined, as recovery of the deformation is prevented by the constraining means. However, certain advantages accrue from the use of a controlled slow heating rate to reach the elevated temperature. One advantage is that damage to the article caused by the force exerted against the constraining means during fast heating as the article attempts to recover is avoided or minimized because stresses occasioned by the onset of recovery are substantially diminished. Secondly, it is possible to precondition alloys in this way that are only marginally suited to purely thermal or mechanical preconditioning. In view of the fact that stress induced martensitic forms locally, it is also within the scope of this invention to impart to an article an elevated $A_s$ by mechanical preconditioning and then cool the article to below its normal $M_s$, deform it again giving it a dual $A_s$. The second $A_s$ can be advanced by thermal preconditioning to a temperature below that of the $A_s$ imparted by mechanical preconditioning.

Although the constraining means can be removed at the holding temperature, two advantages flow from the additional step of cooling the deformed article to a lower temperature prior to such removal. The first is that cooling, for example, to the $M_s$-$M_f$ range or below, minimizes the work needed to remove the constraining means. Secondly, by cooling the article under constraint from the holding temperature to a lower temperature, an additional increment of heat recoverable strain can be imparted to the article. After the constraining means has been removed, this increment of strain is usually recovered during a subsequent fast heating step over the temperature interval defined by the temperature at which the constraining means is released and the holding temperature. This additional increment of strain has its own $A_s$ temperature. In other words, the article has a 1st $A_s$ below the $A_s$ (2nd $A_s$) imparted by mechanical preconditioning. As a result, a two stage heat recovery can be obtained.

In our previous application directed to thermal preconditioning (Ser. No. 417,067 filed Nov. 19, 1973, abandoned), we describe our discovery that the loss of reversibility between martensite and austenite can be minimized by aging the composition while in the austenitic state. We have since discovered that some metallic compositions also respond better to thermal and mechanical preconditioning if aged while in the austenitic state in that a higher portion of the retained strain is heat recoverable. See "Austenitic Aging of Metallic Compositions", Ser. No. 550,556, filed on even date herewith as a C.I.P. of Ser. No. 417,067 filed Nov. 19, 1973, abandoned the disclosure of which is incorporated by reference. However, if the mechanical preconditioning conditions are the same, the $A_s$ temperature imparted to an unaged sample is often somewhat higher than that of an aged sample of the same composition. For those beta phase alloys of Cu containing varying amounts of zinc, aluminum, silicon, manganese and combinations thereof, having an $M_s$ temperature below room temperature aging at from about 50° to 125° C for a time ranging from about 5 minutes to 3 or 4 hours is usually adequate. For other compositions, the time and temperature that will produce the optimum results may vary but is readily ascertained by comparing the amount of heat recoverable strain retained by samples of the same composition aged under different conditions.

The end use to which the article is put will determine its recovered and recoverable configuration. The deformation force applied to the preconditioned article can be any of a variety of types including bending, twisting, compressing and expansion forces and may employ any convenient constraining means. In this way, articles that recover from an L to an I shape and vice versa can be obtained. Articles that lengthen or shorten are also possible. Cylindrical articles, particularly hollow ones, that expand to a larger diameter or that contract to a smaller diameter are readily made by the process of this invention. As a result of the fact that mechanical preconditioning occurs in the area of the stress it is possible to precondition but a portion of the article. This allows a series of deformations to be built into the article which can recover at different temperatures.

The following examples illustrate the invention:

EXAMPLE 1

A 38 × 5 × 0.75mm strip of brass containing 64.6 wt. % Cu −34.4 wt. % Zn −1.0 wt. % Si was betatized at 800° C, then water quenched. After this treatment, the $M_s$ was at +2c and the strip was pseudoelastic at room temperature, that is, the $A_s$ and $A_f$ were below room temperature.

The strip was bent into a loop at room temperature (outer fiber strains 7%) and clamped for one hour. Upon release, the loop remained bent (retained outer fiber strain ~5%). When heated to 200° C, the strip became straight again.

EXAMPLE 2

A 14-cm length of 0.9mm diameter wire made up of 70 wt. % Cu −26 wt. % Zn −4 wt. % Al was betatized at 700° C for three minutes, then water quenched. After this treatment, the wire was pseudoelastic at room temperature and had an $M_s$ at −3° C.

The sample was bent so as to have an outer fiber strain of 4.3% and constrained in this configuration at room temperature. From time to time, the constraining means was released, the retained strain measured, then the wire was returned to its constraint. Retained strain increased as follows:

| days | Retained strain |
| --- | --- |
| 0 | 0 |
| 3 | 1 |
| 18 | 1.4 |
| 193 | 2.8 |
| 252 | 2.9 |

After the last measurement, the bent wire was immersed in oil at 200° C. It straightened immediately. This example demonstrates the effect on the retained strain of prolonging the holding time.

EXAMPLE 3

Samples were cut from 0.76mm sheets of the alloy compositions listed below. The strips were betatized at 800° C and water quenched. All were pseudoelastic at room temperature, as their low $M_s$ temperatures would suggest. The samples were bent and constrained at room temperature so as to cause an outer fiber strain of 4.25%. The samples and constraints were transferred to a bath a 200° C and held for 72 hours. Next, the constrained samples were cooled to room temperature. Virtually no springback occurred as the samples were removed from the constraining means. The samples were then rapidly heated. Both the heat recoverable strain and the temperature range over which it occurred are listed in the table below:

| Composition | Ms | Elevated HRS | As | Af |
| --- | --- | --- | --- | --- |
| 74Cu 18Zn 7Al 1Mn | −40° C | 0.5% | 375° C | 500° C |
| 76Cu 12Zn 8Al 4Mn | −44° C | 2.3% | 375° C | 525° C |
| 77.5Cu 9.5Zn 9Al 4Mn | −40° C | 2.75% | 350° C | 525° C |
| 77.75Cu 8.25Zn 9Al 5Mn | −28° C | 2.3% | 300° C | 500° C |
| 79.1Cu 5.9Zn 10Al 5Mn | −40° C | 3% | 350° C | 525° C |
| 79Cu 4Zn 10Al 7Mn | −40° C | 2.2% | 350° C | 525° C |
| 77.5Cu 7.5Zn 9Al 6Mn | −50° C | 1.6% | 375° C | 525° C |
| 78.25Cu 5.75Zn 9Al 7Mn | 0° C | 1.7% | 400° C | 525° C |

This example demonstrates that the $A_s$ temperature imparted to the alloy is not dependant upon the temperature at which the preconditioning is accomplished.

EXAMPLE 4

In that a number of variables are important to successful mechanical preconditioning, an experiment was designed to test several variables simultaneously. Five variables were tested at each of two levels, thus the experimental design was $2^5$ factional. The variables were:

| | Betatization | Cooling Rate | Strain | Holding Temp. | Holding Time |
| --- | --- | --- | --- | --- | --- |
| high level | 650° C - 5 min. | Air Cool | 7.10% | 125° C | 150 min. |
| low level | 575° C - 5 min. | Water Quench and age 50° C - 5 min. | 4.53% | 50° C | 15 min. |

The experimental design was exercised using four alloys:

| Weight Percent | | | | Ms | |
| --- | --- | --- | --- | --- | --- |
| Cu | Al | Mn | Air Cooled | WQ + 5 min., 50° C | |
| 79.2 | 10.0 | 10.8 | −10C | −32 C | |
| 78.9 | 10.0 | 11.1 | −41 | −45 | |
| 79.04 | 9.86 | 11.1 | −30 | −47 | |
| 79.07 | 10.13 | 10.8 | −14 | −32 | |

Samples were prepared by air-melting the compositions above, casting and rolling the 0.76mm sheet. Strips were cut from the sheet, and betatized by heating 5 minutes at 575° or 650° C. Next, the samples were water quenched and aged 5 minutes at 50° C or air cool. All the samples were cooled to −60° C then deformed and constrained either 4.53 or 7.1% by bending the samples around a mandrel and placing them in a clamping fixture. The samples and their constraining fixtures were transferred to baths at 50° or 125° C and held for 15 minutes or 150 minutes. After the holding process, the samples and constraining fixtures were cooled to −80° C, the constraints were removed and the retained strain measured. The unconstrained samples were transferred to a bath at 0° C, and again, the retained strain was measured. This procedure was repeated with baths at 20° C, 50° C, 100° C, 200° C and 400° C. The resulting strain measurements were analyzed to determine the magnitude of the main effects and interactions with respect to the ranges over which the variables were exercised.

The strain which was heat recoverable in the temperature range above 50° C was taken as a measure of performance. Statistical analysis indicated significance for the main effect of strain, average 1.95%, and hold temperature, average 1.65%. The other main effects and interactions were not significant in this experiment.

Within this experimental design, the best conditions were 7.1% strain at a holding temperature of 125° C. This gave an average of 3.81% heat recoverable strain above 50° C.

EXAMPLE 5

An alloy containing 64 wt. % copper, 35 wt. % zinc and 1 wt. % silicon was studied. This alloy has an $M_s$ temperature of $-40°$ C.

Specimens were betatized for 5 minutes at 860° C quenched into water at 20° C, and then aged for different times in the metastable beta phase, which in this series of experiments was performed at 50° C. After insertion in the tensile loading device (approximately 5 minutes to set up at ambient temperature) the specimens were cooled to $-65°$ C and deformed 8% in tension. After deformation, a constraint was applied to the tensile rig so that no contraction could take place, but the specimens were free to undergo a spontaneous expansion if one occurred. The constrained specimen was placed in water at $+40°$ C, which provides a very fast heating rate and was held at that temperature for different times before re-cooling to below the $M_f$. Specimens came free of the constraint during cooling with a slight expansion compared with its original set after deformation. The constraint was removed from the apparatus so that specimens, now in their preconditioned state, could heat recover freely when reheated at a fast rate in a furnace set at 600° C.

The $A_s$ temperatures and heat-recoverable strains were measured as a function of the two main variables, aging time at 50° C before deformation and the time held under constraint at 40° C.

Results of mechanical preconditioning are shown in Table 1. For each aging time at 50° C some specimens have also been fast heated directly after deformation at $-65°$ C, in order to compare the effect of mechanical preconditioning on the $A_s$ temperature.

Table 1 shows clearly the trend that the 2nd $A_s$ temperature was raised as the holding time at 40° C was increased and in many cases exceeded the temperature of 40° C. On the other hand, the total heat-recoverable strain (i.e. 1st $A_s$ to $A_f$) was reduced with increased holding time at 40° C, and this loss in recovery occurred mainly in that portion of heat-recoverable strain between the 2nd $A_s$ and $A_f$.

TABLE I

| Aging Time | Pre-cond. Holding Time at 40° C | Strain Per cent | As Temp. ° C 1st | As Temp. ° C 2nd | Recovery above 2nd $A_s$ per cent strain | Total Recovery per cent strain |
|---|---|---|---|---|---|---|
| | No Precond. | 7.05 | −50 | — | — | 6.50 |
| 5 mins at R.T. | 10 secs | 6.90 | −43 | −4 | 5.65 | 6.80 |
| | 30 secs | 7.10 | −37 | 31 | 4.15 | 5.65 |
| | 1 min. | 6.90 | −40 | 19 | 4.80 | 5.90 |
| | 5 min. | 7.65 | −37 | 59 | 2.90 | 3.95 |
| | 10 min. | 6.95 | −17 | 23 | 2.80 | 3.55 |
| | 1 hr. | 7.10 | −45 | 19 | 3.10 | 4.00 |
| | No Precond. | 7.25 | −33 | — | — | 6.95 |
| 45 mins at 50° C | 10 secs | 6.75 | −49 | −9 | 5.30 | 6.55 |
| | 30 secs | 6.35 | −52 | 4 | 4.40 | 5.85 |
| | 1 min. | 7.10 | −43 | 23 | 4.45 | 5.70 |
| | 5 min. | 7.35 | −40 | 20 | 5.60 | 7.00 |
| | 10 min. | 7.20 | −51 | 19 | 3.65 | 5.15 |
| | 1 hr. | 7.55 | −44 | 54 | 2.65 | 4.20 |
| | No Precond. | 7.00 | −32 | — | — | 6.75 |
| 3 hrs. at 50° C | 10 secs | 7.25 | −41 | −4 | 5.75 | 7.00 |
| | 30 secs | 7.20 | −32 | 15 | 4.15 | 5.65 |
| | 1 min. | 7.05 | −30 | 19 | 5.65 | 6.85 |
| | 5 min. | 6.85 | −47 | 13 | 4.80 | 6.20 |
| | 10 min. | 7.20 | −32 | 29 | 5.65 | 6.65 |
| | 1 hr. | 7.30 | −37 | 38 | 4.15 | 5.25 |
| | 5 hrs. | 7.15 | −44 | 44 | 5.60 | 6.75 |
| | 16 hrs. | 7.50 | −39 | 80 | 3.75 | 5.25 |
| | No Precond. | 7.20 | −27 | — | — | 6.70 |
| 24 hrs. at 50° C | 10 secs | 7.05 | −37 | −4 | 5.85 | 6.55 |
| | 30 secs | 7.25 | −42 | −5 | 5.80 | 7.25 |
| | 1 min. | 7.45 | −43 | 0 | 5.70 | 6.95 |
| | 5 min. | 7.50 | −35 | 24 | 5.75 | 6.70 |
| | 10 min. | 7.50 | −42 | 35 | 5.85 | 7.25 |
| | 1 hr. | 7.80 | −34 | 29 | 4.70 | 5.80 |
| | 5 hrs. | 7.40 | −34 | 35 | 5.05 | 5.95 |
| | 16 hrs. | 7.15 | −47 | 69 | 2.90 | 4.70 |
| | No Precond. | 7.10 | −33 | — | — | 6.80 |
| 1 wk at 50° C | 10 min. | 7.00 | −28 | 33 | 5.60 | 6.45 |
| | 1 hr. | 7.25 | −37 | 47 | 5.20 | 6.20 |
| | 5 hrs. | 7.45 | −37 | 40 | 5.15 | 6.70 |
| | 16 hrs. | 7.55 | −40 | 33 | 5.60 | 6.70 |

Increasing the aging time at 50° C, in metastable beta phase, greatly improved the overall heat-recoverable strains (HRS's) but had only a slight effect in reducing the 2nd $A_s$ temperature.

The effect of storage at room temperature was also examined. After the mechanical preconditioning treatment specimens were cooled and the constraint removed, as previously. Instead of directly heating at a fast rate, the specimens were allowed to warm to room temperature (20° C ± 2) at which temperature they were stored for up to three weeks. After storage, specimens were replaced into the testing rig, and heated directly from room temperature to above the $A_f$ temperature.

As an example, one specimen was aged 1 week at 50° C and held in restraint for 16 hours at 40° C (the last result in Table 1). The efficiency of heat recovery when directly heated from the $M_f$ after releasing the constraint, was 74%. This value fell to 57.4% after storage for two days, 47.8% after 1 week, and 45.4% after three weeks at 20° C. The second $A_s$ temperature remained constant at about 35° C.

EXAMPLE 6

An alloy containing 63.5 wt. % copper, 35.5 wt. % zinc and 1.0 wt. % aluminum was studied. Experimental conditions for mechanical preconditioning of this alloy were exactly the same as described in example 5, except that the deformation temperature which was −50° C. The alloy had an $M_s$ approximately −25° C. Specimens were again aged in metastable beta phase at 50° C, and held under constraint at 40° C.

For specimens aged 3 hours at 50° C, and immediately fast-heated after deformation at −50° C, 1st $A_s = -13°$ C, but no 2nd $A_s$ was observed, HRS = 7.20% (94% efficiency). Results of a specimen aged 3 hours at 50° C and mechanically preconditioned are shown in Table II. Compared with the previous example of a copper-zinc-silicon alloy, the rise in 2nd $A_s$ temperature is not as high in this alloy.

1st $A_s = -35°$ C, no 2nd $A_s$, HRS = 7.10 (98% efficiency).

As shown in Table III below the 2nd $A_s$ temperatures in this alloy were not raised as much as the previous alloy containing 1% aluminum, but correspondingly the heat recoverable strains are very high.

TABLE III

| Aging Time | Pre-cond. Holding Time at 40° C | Strain Per cent | $A_s$ temp., C. 1st | 2nd | Recovery above 2nd $A_s$ per cent strain | Total Recovery per cent strain |
|---|---|---|---|---|---|---|
| 3 hrs at 50° C | 10 secs | 6.60 | −47 | −10 | 5.85 | 6.30 |
| | 30 secs | 7.50 | −40 | −8 | 6.85 | 7.35 |
| | 1 min | 6.85 | −19 | 15 | 5.75 | 6.50 |
| | 5 min | 7.10 | −34 | −9 | 5.95 | 6.60 |
| | 10 min | 7.10 | −22 | 11 | 5.45 | 6.75 |
| | 1 hr | 7.70 | −24 | 21 | 5.25 | 7.30 |
| | 5 hr | 7.75 | −19 | 8 | 5.65 | 6.65 |
| | 16 hr | 7.65 | −25 | 19 | 6.40 | 7.20 |

It should be pointed out that the aluminum containing alloy of this example and that of Example 6 could not be treated to have a raised $A_s$ temperature by Thermal Preconditioning, as it was not possible in practice to prevent heat recovery during slow heating to the preconditioning temperature.

The same alloy was also aged in the beta phase at 100° C and held at 40° C, and aged at 50° C and held under constraint at 80° C. The results from these treatments are shown in Table IV, for specimens aged 3 hours at the appropriate temperature and held for different times in the stress-induced martensite state.

IV

| Aging Time | Pre Cond. Holding Temp (C°) | Pre Cond. Holding Time | Strain per cent | $A_s$ Temp., C. 1st | 2nd | Recovery above 2nd $A_s$ per cent strain | Total Recovery per cent strain |
|---|---|---|---|---|---|---|---|
| 3 hrs at 100° C | 40 | 10 mins | 7.15 | −40 | −6 | 5.65 | 6.50 |
| | | 1 hr | 7.70 | −33 | −2 | 5.75 | 6.60 |
| | | 5 hrs | 6.10 | −28 | 23 | 4.35 | 5.35 |
| | | 16 hrs | 7.35 | −29 | 20 | 5.70 | 6.65 |
| 3 hrs at 50° C | 80 | 10 hrs | 7.80 | −33 | 43 | 4.85 | 6.10 |
| | | 1 hr | 6.75 | −32 | 53 | 3.40 | 5.10 |
| | | 5 hr | 8.25 | −26 | 102 | 1.90 | 3.30 |

The overall effect of the higher aging temperature is to reduce the raised $A_s$ temperature and increase heat recoverable strains.

The increase in preconditioning temperature from 40° to 80° C has a much greater effect than the aging temperature on the raised $A_s$ temperature. As shown in Table 4 increasing the holding time at 80° C from 10 minutes to 5 hours raises the preconditioned (2nd) $A_s$ from 43° C (i.e. less than the holding temperature). Heat recovery is correspondingly reduced as the 2nd $A_s$ temperature increases.

TABLE II

| Aging Time | Pre-cond. Holding Time at 40° C | Strain Per cent | As temp., C. 1st | 2nd | Recovery above 2nd $A_s$ per cent strain | Total Recovery per cent strain |
|---|---|---|---|---|---|---|
| 3 hrs at 50° C | 10 secs | 7.75 | −35 | −1 | 6.60 | 7.10 |
| | 30 secs | 7.60 | −13 | 40 | 5.45 | 6.40 |
| | 1 min | 7.95 | −32 | −5 | 5.60 | 5.90 |
| | 5 min | 8.40 | −19 | 14 | 6.80 | 7.45 |
| | 10 min | 7.65 | −24 | 17 | 6.00 | 6.60 |
| | 1 hr | 8.10 | −15 | 34 | 5.05 | 5.80 |
| | 5 hr | 7.60 | −22 | 20 | 5.55 | 6.45 |
| | 16 hr | 8.00 | −24 | 25 | 5.90 | 6.55 |

EXAMPLE 7

An alloy containing 65.75 wt. % copper, 32.25 wt. % zinc and 2.00 wt. % aluminum having an $M_s$ of approximately −25° C was studied.

This alloy was treated in the same way as the previous alloy, and was aged at 50° C prior to deformation and held at 40° C under constraint in the mechanical preconditioning treatment. Table 3 shows the results for this alloy when aged for 3 hours at 50° C.

Results for an unconditioned sample of this alloy, aged 3 hours at 50° C and immediately fast heated after deformation at −50° C were:

EXAMPLE 8

An alloy containing 62.2 wt. % copper, 37.3 wt. % zinc and 0.5 wt. % aluminum having an $M_s$ of −33° C and an alloy containing 67.5 wt. % copper, 29.5 wt. % zinc and 3.0 wt. % aluminum having an $M_s$ of $-30°$ C were studied. These alloys were treated in the manner as described for the other copper-zinc-aluminum alloys in examples 6 and 7. Results of mechanical preconditioning after aging in the beta phase for 3 hours at 50° C, and holding under constraint for different times at 40° C, are shown in Table 5. Under the same experimental conditions the heat recoverable strains between the 2nd $A_s$ temperature and $A_f$ are greater in the 3% aluminum alloy than in the alloy with 0.5% aluminum.

TABLE V

| Alloy | Aging Time | Pre Cond. holding time (40° C) | Strain per cent | $A_s$ Temp., C. 1st | 2nd | Recovery above 2nd $A_s$ per cent strain | Total Recovery per cent strain |
|---|---|---|---|---|---|---|---|
| 62.2%Cu | 3 hrs at 50° C | 10 mins | 8.20 | −41 | 24 | 3.15 | 4.10 |
|  |  | 1 hr | 8.35 | −39 | 34 | 3.80 | 4.80 |
|  |  | 5 hr | 7.90 | −44 | 12 | 4.90 | 5.95 |
|  |  | 16 hr | 8.15 | −47 | 29 | 4.25 | 5.30 |
| 67.5%Cu | 3 hrs at 50° C | 10 mins | 6.65 | −27 | 8 | 5.75 | 6.40 |
|  |  | 1 hr | 7.25 | −40 | 24 | 5.35 | 6.60 |
|  |  | 5 hr | 7.15 | −33 | 11 | 6.05 | 6.60 |
|  |  | 16 hr | 7.60 | −21 | 26 | 5.25 | 6.60 |

We claim:

1. A method for expanding the hysteresis loop of an article comprised of a metallic composition capable of undergoing a reversible transformation between austenitic and martensitic states wherein the $A_s$ of the composition is elevated above its normal $A_s$, said method comprising deforming the article from an original configuration into a second deformed configuration from which heat recovery towards said original configuration is desired, applying constraining means to said article and holding the article in said deformed configuration at a temperature above the temperature $M_s$ at which formation of martensite in the metallic composition is induced thermally in the absence of applied stress for a time sufficient to cause at least a portion of the deformation to be retained as heat recoverable strain, the recovery of which towards the original configuration begins above the normal $A_s$ of the metal composition, when the constraining means is removed and removing said constraining means.

2. A method according to claim 1 wherein the article is deformed while in the austenitic state.

3. A method according to claim 1 wherein the article is deformed at a temperature below the holding temperature and its temperature raised to the holding temperature while under constraint.

4. A method according to claim 3 wherein the article is deformed at about its $M_s$ temperature.

5. A method according to claim 3 wherein the article is deformed at a temperature within the $M_s$-$M_f$ range.

6. A method according to claim 3 wherein the article is deformed at a temperature below the $M_s$-$M_f$ range.

7. A method according to claim 1 wherein the temperature of the article is lowered to within the $M_s$-$M_f$ range prior to removal of the constraining means.

8. A method according to claim 1 wherein the article is cooled to below the $M_s$-$M_f$ range prior to removal of the constraining means.

9. A method according to claim 1 wherein the article is deformed while in the martensitic state and slowly heated to the holding temperature.

10. A method according to claim 1 wherein prior to its deformation, the article is held at a temperature above the $M_s$ temperature while in the austenitic state for a time sufficient to reduce the loss of reversibility between the martensitic and austenitic states and to improve its preconditionability.

11. A method according to claim 1 wherein the metallic composition is an alloy that forms an electron compound.

12. A method according to claim 11 wherein the alloy is a body centered cubic type analagous to beta-brass having a ratio of about 3 valence electrons to 2 atoms.

13. A method according to claim 1 wherein the metallic composition is a beta-phase alloy comprising copper and a metal selected from the group consisting of zinc and aluminum.

14. A method according to claim 13 wherein said metal is zinc and the alloy further contains a member selected from the group consisting of aluminum, manganese, silicon, tin and combinations thereof.

15. A method according to claim 13 wherein said metal is aluminum and wherein said alloy further contains a member selected from the group consisting of manganese, zinc and mixtures thereof.

16. A method according to claim 1 wherein the metallic composition is a beta-phase alloy comprising by weight 60–85% copper, 0–40% zinc, 0–5% silicon, 0–14% aluminum and 0–15 wt. % manganese.

* * * * *